US010676005B2

(12) United States Patent
Schnur et al.

(10) Patent No.: US 10,676,005 B2
(45) Date of Patent: Jun. 9, 2020

(54) VEHICLE FLOOR MAT WITH STORABLE BARRIERS

(71) Applicant: Faurecia Interior Systems, Inc., Auburn Hills, MI (US)

(72) Inventors: Brett Schnur, Farmington Hills, MI (US); Maxime Salandre, Rochester, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 16/107,636

(22) Filed: Aug. 21, 2018

(65) Prior Publication Data

US 2020/0062158 A1  Feb. 27, 2020

(51) Int. Cl.
| | |
|---|---|
| *B60N 3/04* | (2006.01) |
| *B65D 21/08* | (2006.01) |
| *B65D 25/04* | (2006.01) |
| *B60R 7/02* | (2006.01) |
| *B60R 11/00* | (2006.01) |

(52) U.S. Cl.
CPC ............ *B60N 3/048* (2013.01); *B60N 3/044* (2013.01); *B60R 7/02* (2013.01); *B65D 21/086* (2013.01); *B65D 25/04* (2013.01); *B60R 2011/0029* (2013.01)

(58) Field of Classification Search
CPC . B60N 3/048; B60N 3/044; B60R 2011/0029; B60R 7/02; B60R 7/04
USPC ...................................................... 296/37.14
See application file for complete search history.

(56) References Cited

U.S. PATENT DOCUMENTS

| | | | | |
|---|---|---|---|---|
| 1,378,610 | A | * | 5/1921 | Perkins ..................... B60R 9/02 280/164.1 |
| 2,897,963 | A | | 8/1959 | Byers, Jr. |
| 4,226,348 | A | | 10/1980 | Dottor et al. |
| 4,564,546 | A | | 1/1986 | Jones |
| 5,167,433 | A | | 12/1992 | Ryan |
| 5,384,939 | A | | 1/1995 | Weber |
| 6,015,071 | A | * | 1/2000 | Adomeit ................... B60R 7/02 220/6 |
| 6,220,645 | B1 | | 4/2001 | Jacquemin |
| 6,244,802 | B1 | | 6/2001 | Stanesic et al. |

(Continued)

FOREIGN PATENT DOCUMENTS

| | | |
|---|---|---|
| BR | PI9300545 A | 8/1993 |
| DE | 19718509 C1 | 4/1998 |

(Continued)

*Primary Examiner* — Scott T McNurlen
(74) *Attorney, Agent, or Firm* — Reising Ethington P.C.

(57) ABSTRACT

A vehicle floor mat for a passenger foot well or a cargo area of an automotive vehicle comprising a mat body, first and second cavities formed in the mat body, and first and second barriers respectively configured for receipt within the first and second cavities when the first and second barriers are horizontally oriented in a stored position. The first and second barriers can be moved from the stored position to an extended position, wherein the first and second barriers are vertically oriented and extend at least partially above a top surface of the mat body. In the extended position, opposing surfaces of the first and second barriers together define a confined region therebetween in which a package can be contained during transportation thereof.

15 Claims, 4 Drawing Sheets

(56) References Cited

U.S. PATENT DOCUMENTS

| | | | |
|---|---|---|---|
| 6,338,518 B1* | 1/2002 | D'Annunzio | B60R 7/02 |
| | | | 296/24.4 |
| 2004/0134946 A1* | 7/2004 | Gammon | B60R 7/02 |
| | | | 224/275 |
| 2009/0243322 A1* | 10/2009 | Vance | B60R 13/01 |
| | | | 296/39.1 |
| 2010/0270821 A1* | 10/2010 | Ulita | B60R 5/04 |
| | | | 296/37.14 |
| 2015/0217666 A1 | 8/2015 | Garbarino | |
| 2016/0059790 A1 | 3/2016 | Perelli et al. | |
| 2016/0144800 A1* | 5/2016 | Henderson | B60R 13/013 |
| | | | 296/24.4 |
| 2017/0129410 A1* | 5/2017 | Ito | B60R 7/02 |
| 2019/0071022 A1* | 3/2019 | Barradas Guarneros | |
| | | | B60R 5/04 |

FOREIGN PATENT DOCUMENTS

| | | |
|---|---|---|
| DE | 10338390 B3 | 3/2005 |
| DE | 102010015526 A1 | 10/2011 |
| EP | 1321335 | 4/2005 |
| GB | 2168419 A | 6/1986 |
| KR | 19980028889 U | 8/1998 |
| WO | WO2014194036 A2 | 12/2014 |

\* cited by examiner

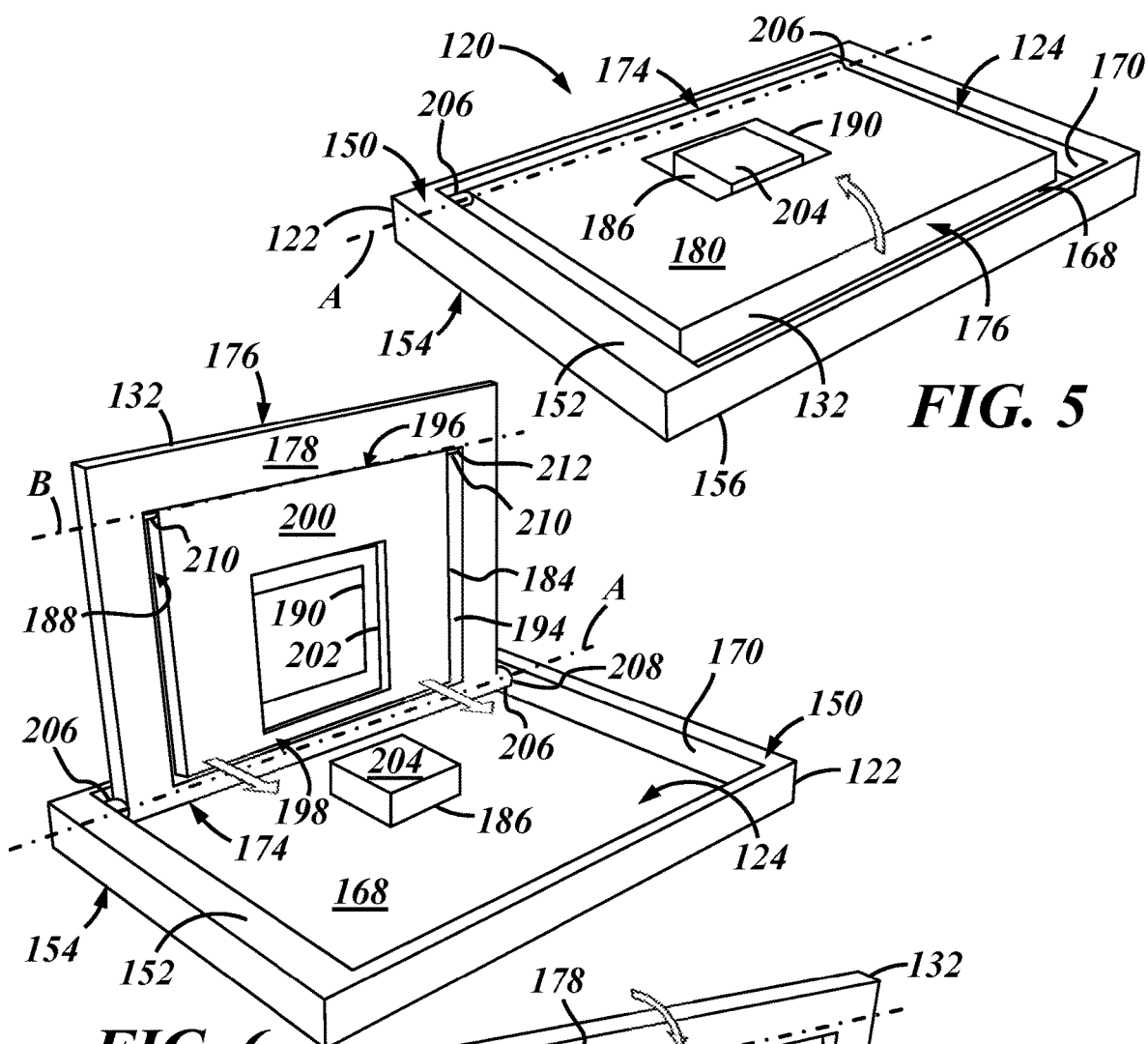
FIG. 5
FIG. 6
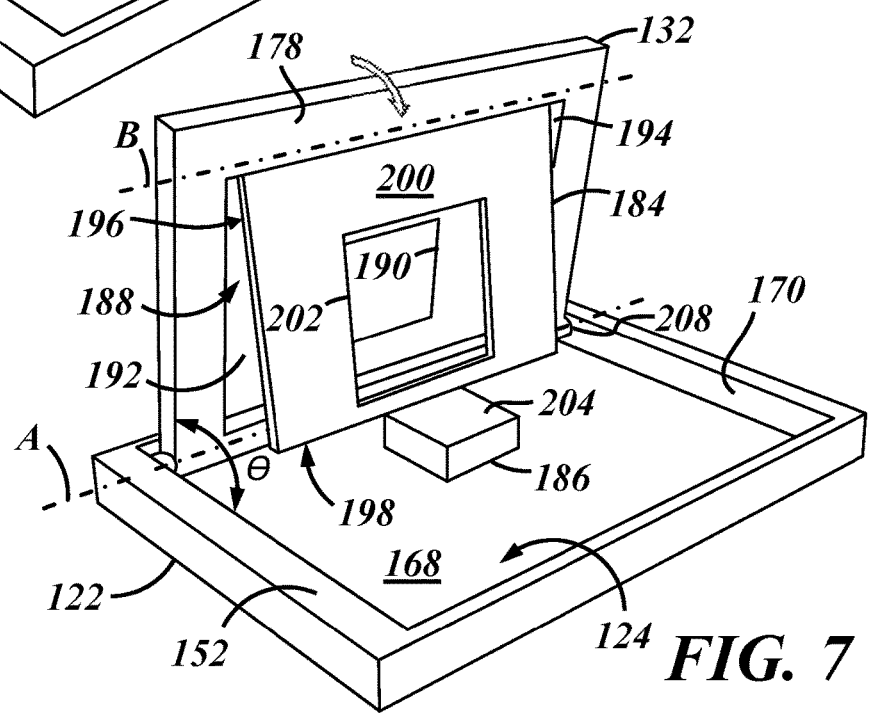
FIG. 7

VEHICLE FLOOR MAT WITH STORABLE BARRIERS

TECHNICAL FIELD

The present disclosure relates to a vehicle floor mat and, in particular, to a vehicle floor mat for securing objects in position on a floor of a vehicle during transportation thereof.

BACKGROUND

Floor mats are oftentimes configured for use in areas of automotive vehicles that tend to experience high wear or are frequently exposed debris to protect an underlying floor of the vehicle. For example, floor mats are commonly placed over driver foot well areas, front passenger foot well areas, rear passenger foot well areas, and/or cargo areas of automotive vehicles.

Packages and other articles, such as groceries and personal items, are frequently transported in automotive vehicles and may be placed on the floor of the vehicle during transportation thereof. However, it is common for such articles to shift during movement of the vehicle, possibly causing damage to the article or the vehicle, and potentially creating an unwanted distraction for a driver of the vehicle. Therefore, there is a need in the art for a vehicle floor mat that can effectively protect the floor area of an automotive vehicle and also can help secure and prevent movement of an article that is placed on the floor mat during operation of the vehicle.

SUMMARY

In accordance with one or more embodiments, a vehicle floor mat comprises: a mat body including a top surface and an opposite bottom surface, first and second cavities formed in the mat body, and first and second barriers respectively configured for receipt within the first and second cavities. The mat body may be configured to conform to and overlie a surface defined by a passenger foot well or a cargo area of an automotive vehicle. Each of the first and second cavities may be defined by a base wall and a peripheral sidewall that extends from the top surface of the mat body to the base wall. The first and second barriers are moveable between a stored position and an extended position. In the stored position, the first and second barriers are horizontally oriented and respectively contained within the first and second cavities. In the extended position, the first and second barriers are vertically oriented and extend at least partially above the top surface of the mat body. When both the first and second barriers are in the extended position, opposing surfaces of the first and second barriers together define a confined region therebetween in which a package can be contained during transportation thereof.

The proximal ends of the first and second barriers may be respectively pivotally coupled within the first and second cavities about respective first and second pivot axes. In such case, the first and second barriers may move from the stored position to the extended position by respectively rotating about the first and second pivot axes.

When the first and second barriers are in the stored position, inner surfaces of the first and second barriers may face toward the mat body and opposite outer surfaces of the first and second barriers may face away from the mat body. In addition, when the first and second barriers are in the extended position, the outer surfaces of the first and second barriers may be vertically oriented and the outer surface of the first barrier may face toward the outer surface of the second barrier.

In some embodiments, the vehicle floor mat may comprise first and second support members. In such case, proximal ends of the first and second support members may be respectively pivotally coupled to the first and second barriers adjacent distal ends of the first and second barriers. And, after the first and second barriers are moved to the extended position, the first and second support members may be respectively configured to support and secure the first and second barriers in the extended position.

The first and second support members may be moveable between a stored position and a support position. In the stored position, the first and second support members may respectively nest within first and second recesses respectively defined within the first and second barriers. In the support position, distal ends of the first and second support members may extend away from their respective first and second barriers toward the first and second cavities defined in the mat body.

When the first and second barriers are in the stored position, the first and second support members may be respectively contained within the first and second recesses in the first and second barriers and may be located between the top and bottom surfaces of the mat body.

In some embodiments, the vehicle floor mat may comprise first and second podiums respectively extending from the base walls of the first and second cavities toward a plane defined by the top surface of the mat body. In such case, when the first and second support members are in the support position, distal ends of the first and second support members may respectively rest against support surfaces defined by the first and second podiums.

When the first and second barriers are in the stored position, the first and second podiums may respectively extend from the base walls of the first and second cavities, through the first and second support members, and at least partially through the first and second barriers.

In some embodiments, the first or second cavity may include a first coupling element integrally formed in one-piece with the base wall or the sidewall thereof. In addition, the corresponding first or second barrier may include a second coupling element integrally formed in one piece therewith and located at a proximal end thereof. And, in assembly, the first and second coupling elements may be snapped into engagement with each other to form a two-component pivot hinge.

In some embodiments, proximal ends of the first and second barriers may include lateral projections integrally formed in one-piece therewith. And, in assembly, the lateral projections of the first and second barriers may respectively snap into slots formed in the sidewalls of the first and second cavities to respectively pivotally couple the proximal ends of the first and second barriers within the first and second cavities.

When the first and second barriers are in the stored position, inner surfaces of the first and second barriers may respectively face toward the base walls of the first and second cavities defined in the mat body and outer surfaces of the first and second barriers may face away from the mat body. In such case, when the first and second barriers are in the extended position, the inner surfaces of the first and second barriers may form an angle in the range of 60° to 120° with the top surface of the mat body.

In some embodiments, each of the first and second cavities may include a pocket formed in its peripheral sidewall that provides access to a distal end of the first or second barrier so that the first or second barrier can be manually moved from the stored position to the extended position.

In some embodiments, the top surface of the mat body may include a plurality of raised ribs separated by a plurality of channels.

In some embodiments, the mat body and the first and second barriers may be formed via injection molding processes.

In some embodiments, the vehicle floor mat may comprise third and fourth cavities formed in the mat body and third and fourth barriers respectively configured for receipt within the third and fourth cavities. The third and fourth barriers may be moveable between a stored position and an extended position. In the stored position, the third and fourth barriers may be horizontally oriented and respectively contained within the third and fourth cavities. In the extended position, the third and fourth barriers may be vertically oriented and may extend at least partially above the top surface of the mat body. The first, second, third, and fourth cavities and their corresponding first, second, third, and fourth barriers may be respectively located along first, second, third, and fourth sides of a package placement area on the vehicle floor mat. In such case, the confined region may be defined by the opposing surfaces of the first and second barriers and opposing surfaces of the third and fourth barriers.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein:

FIGS. 5, 6 and 7 are perspective views of a portion of another vehicle floor mat including a mat body, a cavity defined within the mat body, a barrier pivotally coupled to the cavity and adapted to nest within the cavity, and a support member pivotally coupled to the barrier and adapted to nest within the barrier;

DETAILED DESCRIPTION

The floor mat described below is configured for use in an automotive vehicle and includes multiple barriers that, when in an extended position, can create a confined region on the floor mat in which a package or other article can be contained during transportation thereof. In the extended position, the barriers extend in a generally vertical direction from a body of the floor mat and effectively limit horizontal movement of any packages or other articles that have been placed within the confined region on the floor mat. When not in use, the barriers may be moved to a stored position in which the barriers are oriented in a generally horizontal direction and housed within cavities defined in the body of the floor mat.

Figure 1:
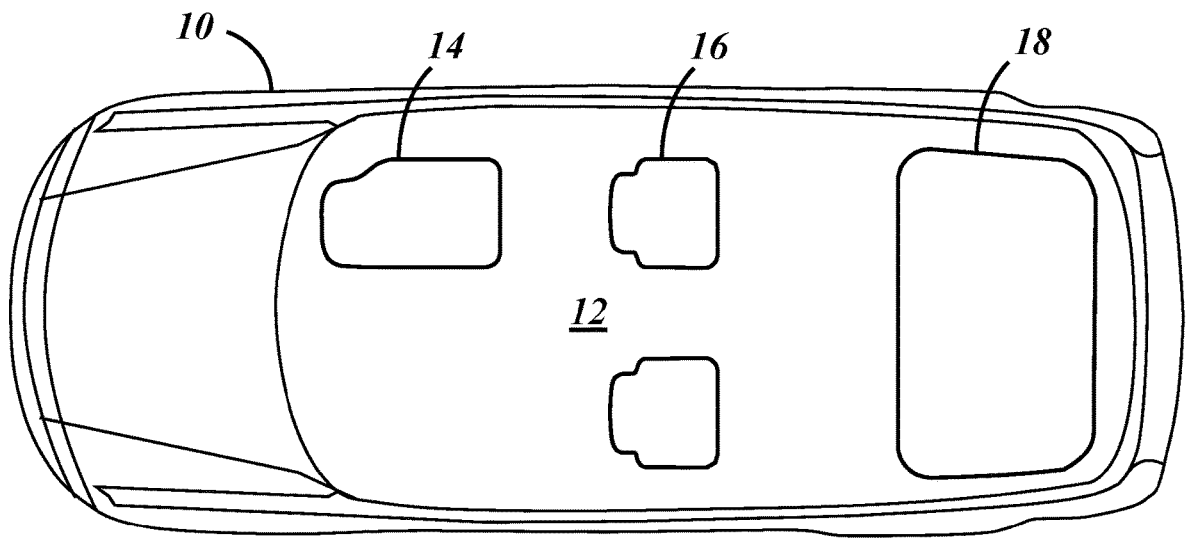
FIG. 1 is a top view of an automotive vehicle depicting the location of a front passenger's side foot well, rear passenger foot wells, and a trunk or cargo area of the vehicle.

As shown in FIG. 1, the floor mats described below may be configured to conform to and overlie various areas on a floor 12 of an automotive vehicle 10. Such areas within the vehicle 10 may be areas where a driver or passenger of the vehicle 10 may desire to temporarily place and secure a package within the vehicle 10 during transportation. For example, the floor mats described below may be configured for use in a front passenger foot well 14, a rear passenger foot well 16, or a cargo area 18 of the vehicle 10. Forward (F) and rearward (R) directions and left (L) and right (R) directions are designated in FIG. 1 and may be referred to as horizontal directions. Upward (U) and downward (D) directions are designated in FIG. 3 and may be referred to as vertical directions.

Figure 2:
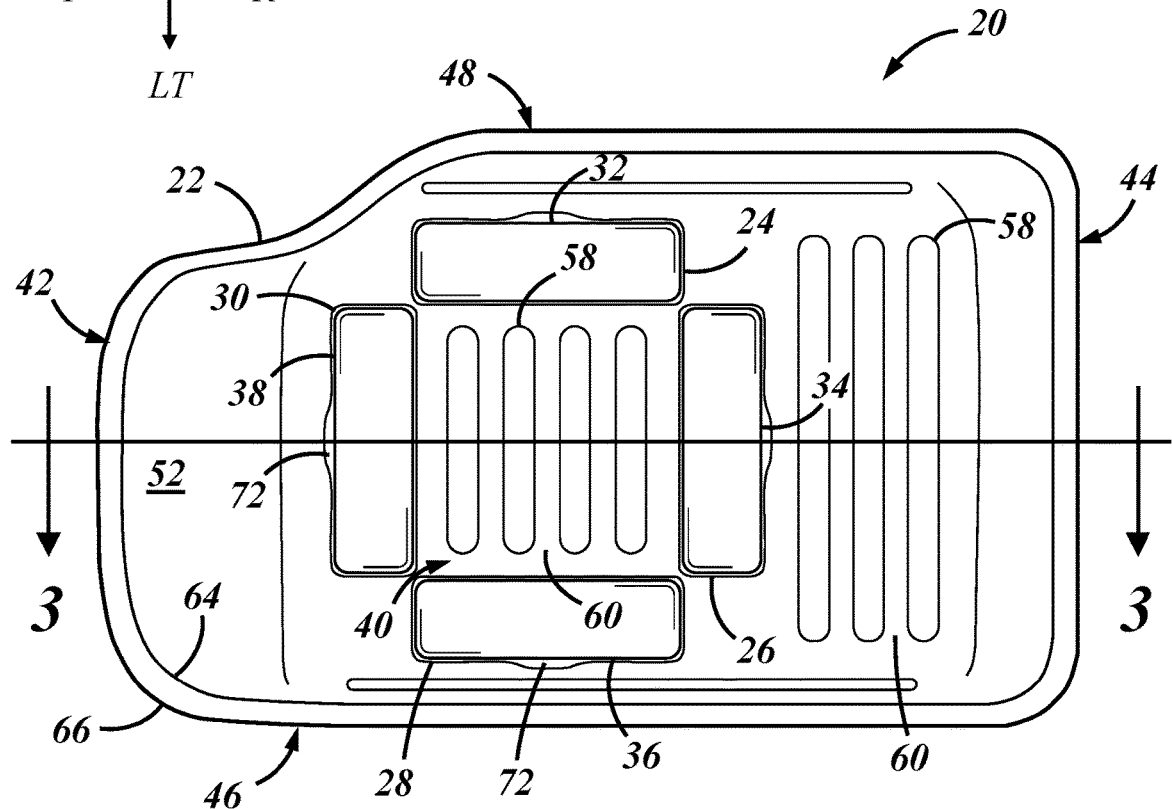
FIG. 2 is a top view of a floor mat sized to fit within a front passenger's side foot well of a vehicle, the floor mat including a plurality of barriers that can be moved from a stored position within a body of the floor mat to an extended position to help contain a package within a confined region on the floor mat.

FIG. 2 illustrates an exemplary vehicle floor mat 20 adapted to conform to and overlie a front passenger foot well 14 of an automotive vehicle 10. The vehicle floor mat 20 includes a mat body 22 with first, second, third, and fourth cavities 24, 26, 28, 30 formed in the mat body 22, and corresponding first, second, third, and fourth barriers 32, 34, 36, 38 respectively disposed within the first, second, third, and fourth cavities 24, 26, 28, 30. In the embodiment depicted in FIG. 2, the first, second, third, and fourth cavities 24, 26, 28, 30 and their corresponding first, second, third, and fourth barriers 32, 34, 36, 38 are arranged on the floor mat 20 surrounding one central package placement area 40 on the floor mat 20; however, other arrangements are certainly possible. In addition, although four cavities 24, 26, 28, 30 and four corresponding barriers 32, 34, 36, 38 are depicted in FIG. 2, in other embodiments, the number of cavities 24, 26, 28, 30 and corresponding barriers 32, 34, 36, 38 in the floor mat 20 may be less than or greater than four.

Figure 3:
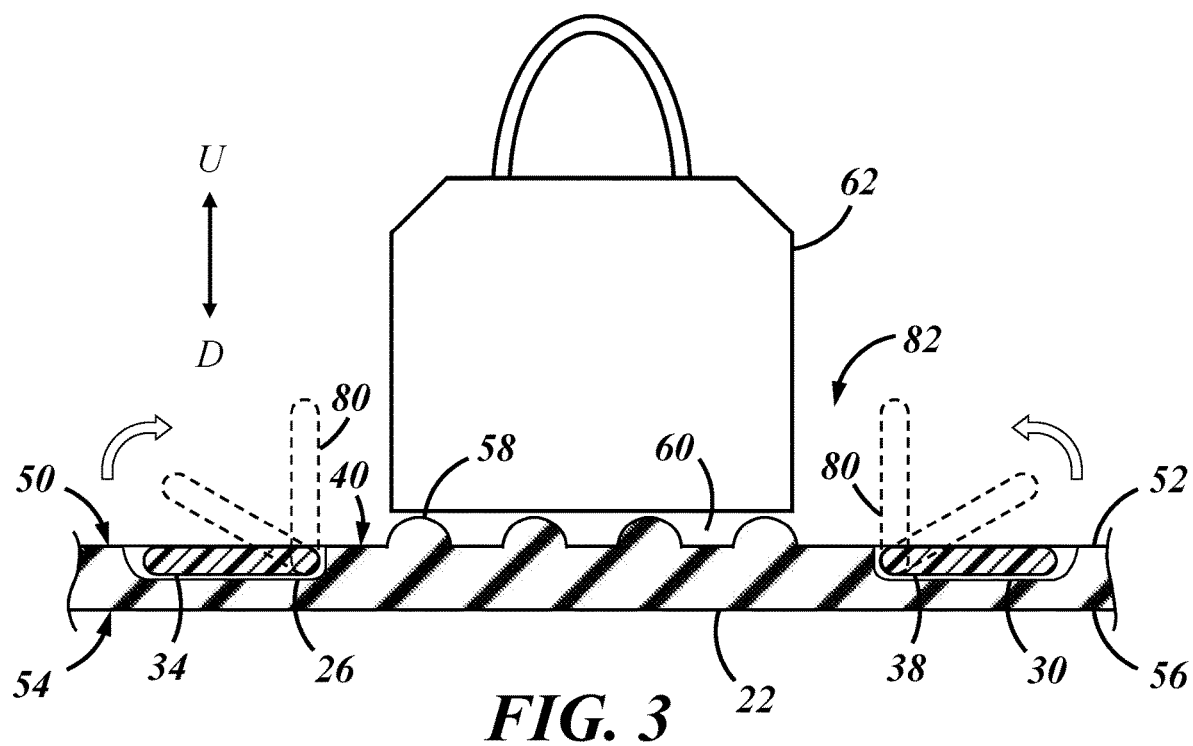
FIG. 3 is a side cross-sectional view of a portion of the floor mat of FIG. 2 taken along line 3-3 and illustrating movement of two opposing barriers from a stored position to an extended position.

As shown best in FIGS. 2 and 3, the mat body 22 includes a forward end 42, a rearward end 44, a left side 46, a right side 48, a top side 50 defining a top surface 52, and a bottom side 54 defining a bottom surface 56. A plurality of ribs 58 separated by a plurality of channels 60 may be formed on the top side 50 of the body 22 to help channel liquid and/or debris to certain regions above the top surface 52 of the body 22 and to help hold a package 62 or an occupant of the vehicle 10 above the top surface 52 of the body 22 and above any liquid and/or debris on the top surface 52 of the body 22. A lip 64 may be formed along an outer periphery 66 of the mat body 22 to help contain liquid and/or debris within the outer periphery 66 of the mat body 22.

Figure 4:
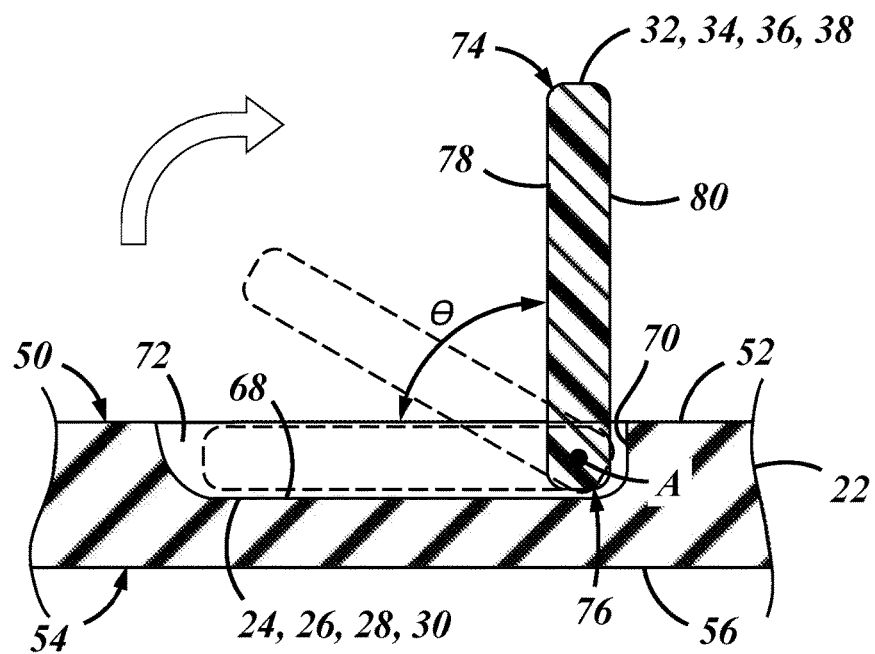
FIG. 4 is a magnified view of one of the barriers of FIG. 2.

Each of the cavities 24, 26, 28, 30 is formed in the top side 50 of the mat body 22 and is adapted to receive one of the barriers 32, 34, 36, 38. As best shown in FIGS. 3 and 4, each of the cavities 24, 26, 28, 30 is defined by a base wall 68 and a peripheral sidewall 70 that extends in a downward direction from the top surface 52 of the mat body 22 to the base wall 68. Pockets 72 (FIGS. 2 and 4) may be formed in the peripheral sidewalls 70 of the cavities 24, 26, 28, 30 to allow access to the corresponding barrier 32, 34, 36, 38 disposed therein.

The barriers 32, 34, 36, 38 are configured for receipt within the cavities 24, 26, 28, 30 and are moveable between a stored position (FIG. 3) wherein the barriers 32, 34, 36, 38 are horizontally oriented, and an extended position (FIG. 4) wherein the barriers 32, 34, 36, 38 are vertically oriented. Referring now to FIG. 4, each of the barriers 32, 34, 36, 38 includes a proximal end 74, a distal end 76, an inner surface 78, and an outer surface 80. The proximal end 74 of each barrier 32, 34, 36, 38 is pivotally coupled to the base wall 68 or the peripheral sidewall 70 of its associated cavity 24, 26, 28, 30 about a pivot axis A. The distal end 76 of each barrier 32, 34, 36, 38 can rotate about the pivot axis A to transition the barrier 32, 34, 36, 38 from a stored position (FIG. 3) to an extended position (FIG. 4), and vice versa. The barrier 32, 34, 36, 38 may be entirely contained within its associated cavity 24, 26, 28, 30 when the barrier 32, 34, 36, 38 is in the stored position (FIG. 3). When the barrier 32, 34, 36, 38 is in the stored position (FIG. 3), the inner surface 78 of the barrier 32, 34, 36, 38 faces toward the base wall 68 of its associated cavity 24, 26, 28, 30 and toward the mat body 22, while the outer surface 80 of the barrier 32, 34, 36, 38 faces away from the cavity 24, 26, 28, 30 and away from the mat body 22. In one form, the outer surface 80 of the barrier 32, 34, 36, 38 may be flush with the top surface 52 of the mat body 22 when the barrier 32, 34, 36, 38 is in the stored position. At least a portion of the barrier 32, 34, 36, 38 extends above the top surface 52 of the mat body 22 when the barrier 32, 34, 36, 38 is in the extended position. When the barrier 32, 34, 36, 38 is in the extended position, the inner and/or outer surfaces 78, 80 of the barrier 32, 34, 36, 38 may form an angle θ in the range of 60° to 120° with the top surface 52 of the mat body 22. In one form, when the barrier 32, 34, 36, 38 is in the extended position, the inner and/or outer surfaces 78, 80 of the barrier 32, 34, 36, 38 may form an angle θ of about 90° (e.g., an angle θ in the range of 80° to 100°) with the top surface 52 of the mat body 22.

The barriers 32, 34, 36, 38 may be kept in the stored position when not in use and are moved to the extended position when desired to hold or secure the package 62 in position on the vehicle floor mat 20. A driver or a passenger of the vehicle 10 may manually move the barriers 32, 34, 36, 38 from the stored position to the extended position by engaging the distal end 74 of the barriers 32, 34, 36, 38 and rotating the distal end 74 about the pivot axis A. Two or more of the barriers 32, 34, 36, 38 may need to be moved to the extended position to effectively hold the package 62 in position on the vehicle floor mat 20. For example, as shown in FIG. 3, when two barriers 34, 38 on opposite sides of the package placement area 40 are moved to the extended position, the outer surfaces 80 of the barriers 34, 38 oppose one another and define a confined region 82 therebetween in which the package 62 can be held during transportation of the package 62 within the vehicle 10. In the extended position, the barriers 32, 34, 36, 38 can effectively contain the package 62 within the confined region 82 by limiting movement of the package to within the confines of the confined region 82 and preventing sliding movement of the package 62 beyond the barriers 32, 34, 36, 38.

The mat body 22 may be made of rubber or another elastomeric material, e.g., ethylene propylene diene rubber (EPDM), and may be formed of integral one-piece construction, such as by an injection molding process. The barriers 32, 34, 36, 38 may be made of an elastomeric material or may be made of a plastic material coated with an elastomeric material. The barriers 32, 34, 36, 38 also may be formed of integral one-piece construction, such as by an injection molding process. The barriers 32, 34, 36, 38 and the cavities 24, 26, 28, 30 may be configured so that the barriers 32, 34, 36, 38 and the cavities 24, 26, 28, 30 can be respectively physically coupled together without use of any other component parts. For example, the barriers 32, 34, 36, 38 may include a first coupling element formed in one-piece therewith at the proximal end 74 thereof, and the cavities 24, 26, 28, 30 may include a second coupling element formed in one-piece with the base wall 68 or the peripheral sidewall 70 thereof. In such case, the first and second coupling elements may be configured to come together in an interference fit and/or in an interlocking arrangement (e.g., a snap fit) to pivotally couple the proximal ends 74 of the barriers 32, 34, 36, 38 within their respective cavities 24, 26, 28, 30. After the proximal ends 74 of the barriers 32, 34, 36, 38 are coupled within their respective cavities 24, 26, 28, 30 in the mat body 22, the barriers 32, 34, 36, 38 may rotate about their respective pivot axes A while remaining pivotally coupled to the cavities 24, 26, 28, 30.

FIGS. 5, 6 and 7 depict a partial view of another vehicle floor mat 120 including a mat body 122, a first cavity 124, a first barrier 132, a support member 184, and a podium 186. The vehicle floor mat 120 depicted in FIGS. 5, 6 and 7 is similar in many respects to the floor mat 20 of FIGS. 2-4 and like numerals between the embodiments generally designate like or corresponding elements throughout the several views of the drawing figures. Subject matter common to the embodiments generally may not be repeated here.

Although the vehicle floor mat 120 shown in FIGS. 5, 6 and 7 only includes one barrier 132 and one corresponding cavity 124, the vehicle floor mat 120 may include multiple barriers 132 respectively physically coupled within multiple corresponding cavities 124 in the mat body 122. Like the vehicle floor mat 20 depicted in FIGS. 2-4, the barriers 132 and their associated cavities 124 may be positioned around a package placement area on the mat body 122, and the barriers 132 may be configured to move from a stored position to an extended position in which opposing surfaces of the barriers 132 together define a confined region therebetween in which a package can be held during transportation thereof within an automotive vehicle.

The mat body 122 includes a top side 150 defining a top surface 152, and a bottom side 154 defining a bottom surface 156. The cavity 124 extends from the top side 150 toward the bottom side 154 of the mat body 122 and is defined by a base wall 168 and a peripheral sidewall 170 that extends in a downward direction from the top surface 152 of the mat body 122 to the base wall 168.

The barrier 132 is configured for receipt within the cavity 124 and includes a proximal end 174, a distal end 176, an inner surface 178, an outer surface 180, a recess 188 extending partway from the inner surface 178 to the outer surface 180 of the barrier 132, and an opening 190 extending through the barrier 132, from the inner surface 178 to the outer surface 180 thereof. The proximal end 174 of the barrier 132 is pivotally coupled to the peripheral sidewall 170 of the cavity 124 about a pivot axis A. The distal end 176 of the barrier 132 rotates about the pivot axis A as the barrier 132 is moved from a stored position (FIG. 5) to an extended position (FIG. 7), and vice versa. The barrier 132 is entirely contained within the cavity 124 when the barrier 132 is in the stored position (FIG. 5), with the inner surface 178 of the barrier 132 facing toward the base wall 168 of the cavity 124 and toward the mat body 122 and the outer surface 180 of the barrier 132 facing away from the cavity 124 and away from the mat body 122. The distal end 176 of the barrier 132 extends above the top surface 152 of the mat body 122 when the barrier 132 is in the extended position (FIG. 7). The recess 188 may be defined by a base wall 192 and a peripheral sidewall 194 that extends from the inner surface 178 of the barrier 132 to the base wall 192.

The support member 184 is configured for receipt within the recess 188 defined in the barrier 132 and includes a proximal end 196, a distal end 198, an inner surface (not shown), an outer surface 200, and a through-hole 202 extending entirely through the support member 184, from the inner surface to the outer surface 200 thereof. The proximal end 196 of the support member 184 is pivotally coupled to the peripheral sidewall 194 of the recess 188 about a pivot axis B. The distal end 198 of the support member 184 rotates about the pivot axis B as the support member 184 is moved from a stored position (FIG. 6) to a support position (FIG. 7), and vice versa. The support member 184 is entirely contained within the recess 188 when the support member 184 is in the stored position (FIG. 6), with the inner surface of the support member 184 facing toward the base wall 192 of the recess 188 and the outer surface 200 of the support member 184 facing away from the recess 188 and away from the barrier 132.

The podium 186 extends from the base wall 168 of the cavity 124 toward a plane defined by the top surface 152 of the mat body 122 and includes a support surface 204. When the barrier 132 is in the stored position, the podium 186 extends from the base wall 168 of the cavity 124, through the through-hole 202 in the support member 184, and at least partially through the opening 190 defined in the barrier 132. When the barrier 132 is in the extended position and the support member 184 is moved to the support position, the distal end 198 of the support member 184 rests against the support surface 204 defined by the podium 186, as best shown in FIG. 7.

When the barrier 132 is in the extended position (FIG. 7), the inner and/or outer surfaces 178, 180 of the barrier 132 may form an angle θ of about 90° with the top surface 52 of the mat body 22. When the distal end 176 of the barrier 132 initially rotates around the pivot axis A away from the base wall 168 of the cavity 124, the distal end 176 of the barrier 132 may need to be rotated slightly past the extended position (FIG. 7) to allow sufficient clearance between the distal end 198 of the support member 184 and the podium 186 so that the distal end 198 of the support member 184 can effectively rotate away from the base wall 192 of the recess 188 and move from the stored position (FIG. 6) to the support position (FIG. 7). After the support member 184 is rotated around the pivot axis B away from the base wall 192 of the recess 188 such that the distal end 198 of the support member 184 is positioned at least slightly above the support surface 204 of the podium 186, the barrier 132 may rotate slightly back toward the base wall 168 of the cavity 124 until the distal end 198 of the support member 184 securely rests against the support surface 204 of the podium 186. In the support position, the support member 184 can hold the barrier 132 in a substantially vertical position with the inner and/or outer surfaces 178, 180 of the barrier 132 forming an angle θ of about 90° with the top surface 52 of the mat body 22.

The mat body 122 and podium 186 may be made of rubber or another elastomeric material, e.g., ethylene propylene diene rubber (EPDM), and may be formed of integral one-piece construction, such as by an injection molding process. The barrier 132 and support member 184 may be made of an elastomeric material or a plastic material coated with an elastomeric material, and may be separately formed of integral one-piece construction, such as by an injection molding process. The barrier 132, cavity 124, recess 188, and support member 184 are configured so that the barrier 132 can be physically coupled to the sidewall 170 of the cavity 124 and the support member 184 can be physically coupled to the sidewall 194 of the recess 188 without use of any other component parts.

In the embodiment depicted in FIGS. 5, 6, and 7, the barrier 132 includes a pair of lateral projections 206 integrally formed in one-piece with the barrier 132 and a pair of slots 208 are formed on opposite sides of the sidewall 170 of the cavity 124. In assembly, the lateral projections 206 are configured to snap into the slots 208 to pivotally couple the barrier 132 within the cavity 124. Likewise, the support member 184 also includes a pair of lateral projections 210 integrally formed in one-piece with the support member 184 that are configured to snap into another pair of slots 212 formed on opposite sides of the sidewall 194 of the recess 188. After the lateral projections 206 of the barrier 132 and the lateral projections 210 of the support member 184 are respectively snapped into the slots 208 in the cavity 124 and the slots 212 in the recess 188, the barrier 132 and the support member 184 and respectively rotate about the pivot axes A, B while remaining respectively pivotally coupled to the cavity 124 and the recess 188.

The vehicle floor mat 120 depicted in FIGS. 5, 6, and 7 is configured so that the barrier 132, the support member 184, and the podium 186 can nest within each other and can be stored together within the cavity 124 defined in the mat body 122 when not in use, with the outer surface 180 of the barrier 132 substantially flush with the top surface 152 of the mat body 122. The podium 186 extends above the base wall 168 of the cavity 124 and allows the support member 184 to support the barrier 132 in a substantially vertical position, without requiring any additional component parts or sliding hinge mechanisms. Alternatively, if the podium 186 was omitted from the vehicle floor mat 120, the support member 184 would rest against the base wall 168 of the cavity 124 when in the support position (instead of against the support surface 204 of the podium 186) and the angle θ formed between the inner and/or outer surfaces 178, 180 of the barrier 132 and the top surface 52 of the mat body 22 would be significantly less than 90°, which might impair the effectiveness of the barrier 132 in containing articles within a confined region on the floor mat 120.

Figure 8:
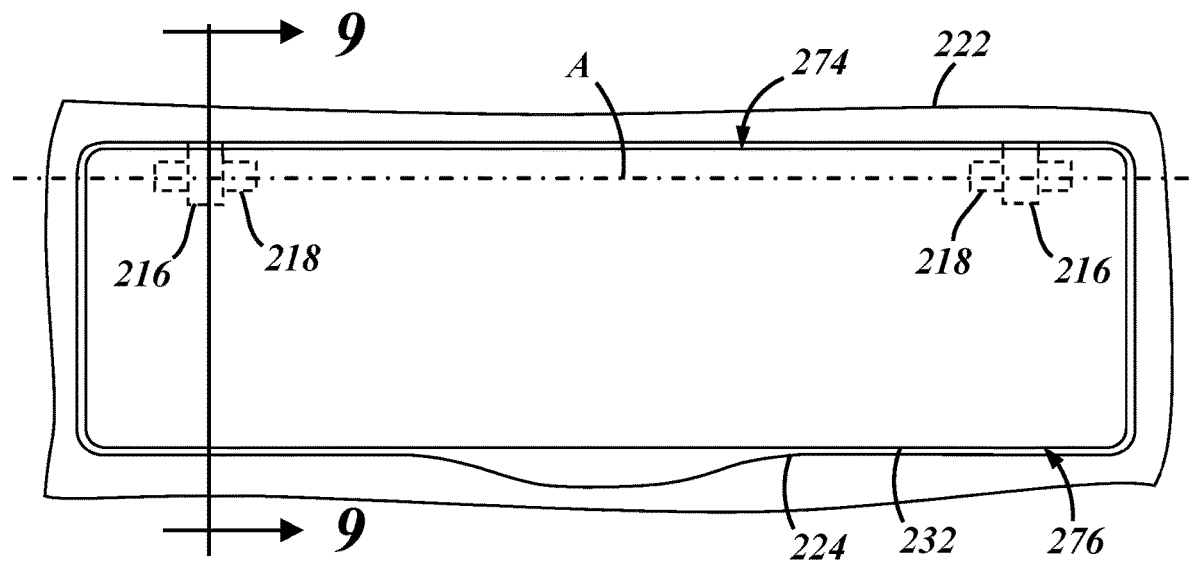
FIG. 8 is a top view of a portion of a mat body of yet another vehicle floor mat including a cavity defined within the mat body and a barrier pivotally coupled within the cavity.
Figure 9:
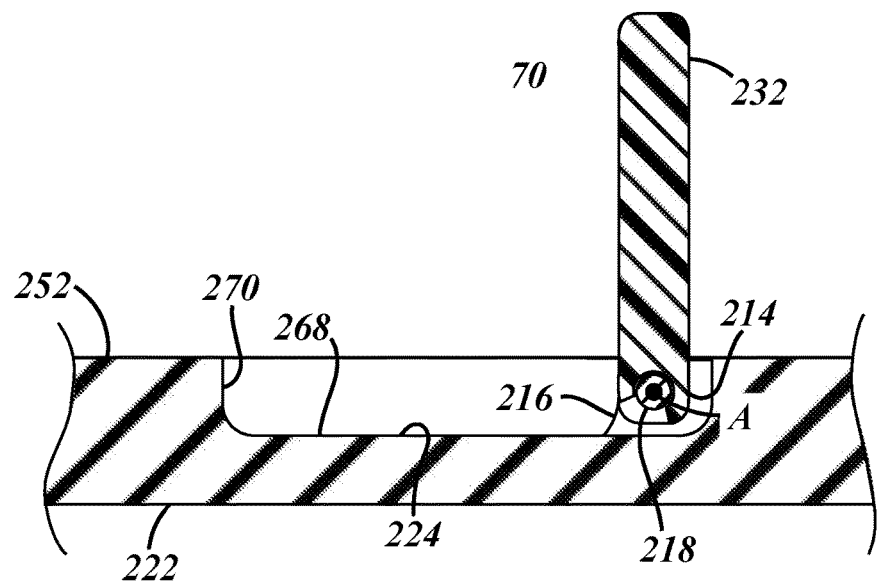
FIG. 9 is a side cross-sectional view of the barrier of FIG. 8 taken along line 9-9.

FIGS. 8 and 9 depict a portion of another mat body 222 of a vehicle floor mat (not shown) having a first cavity 224 defined therein and a first barrier 232 disposed within the cavity 224 and pivotally coupled to the cavity 224 by a snap fit arrangement about a pivot axis A. The mat body 222 depicted in FIGS. 8 and 9 is similar in many respects to the mat bodies 22, 122 of FIGS. 2-7 and like numerals between the embodiments generally designate like or corresponding elements throughout the several views of the drawing figures. Subject matter common to the embodiments generally may not be repeated here.

In the embodiment depicted in FIGS. 8 and 9, the barrier 232 includes a proximal end 274 and a distal end 276. The cavity 224 is defined by a base wall 268 and a peripheral sidewall 270 that extends in a downward direction from a top surface 252 of the mat body 222 to the base wall 268. The barrier 232 includes a pair of clips 214 integrally formed in one-piece with the barrier 232 at the proximal end 274 thereof. A pair of cleats 216 are integrally formed in one-piece with the mat body 222 and extend into the cavity 224 from the base wall 268 and/or the sidewall 270 thereof. Each of the cleats 216 includes a pin 218 projecting in a generally horizontal direction therefrom. The clips 214 are configured to snap over the pins 218 to pivotally couple the proximal end 274 of the barrier 232 within the cavity 224. After the clips 214 are snapped over the pins 218, the barrier 232 can rotate about the pivot axis A while remaining pivotally coupled within the cavity 224.

Although not shown in the drawings, in other embodiments, the proximal end 274 of the barrier 232 may include one or more pins which may be configured to snap into sockets defined by clips extending from the base wall 268 and/or the sidewall 270 of the cavity 224 to couple the proximal end 274 of the barrier 232 within the cavity 224.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle floor mat comprising:
a mat body including a top surface and an opposite bottom surface, the mat body being configured to conform to and overlie a surface defined by a passenger foot well or a cargo area of an automotive vehicle;
first and second cavities formed in the mat body, each of the first and second cavities defined by a base wall and a peripheral sidewall that extends from the top surface of the mat body to the base wall;
first and second barriers respectively configured for receipt within the first and second cavities and moveable between a stored position wherein the first and second barriers are horizontally oriented and respectively contained within the first and second cavities and an extended position wherein the first and second barriers are vertically oriented and extend at least partially above the top surface of the mat body; and
first and second support members that, after the first and second barriers are moved to the extended position, are respectively configured to support and secure the first and second barriers in the extended position,
wherein, when both the first and second barriers are in the extended position, opposing surfaces of the first and second barriers together define a confined region therebetween in which a package can be contained during transportation thereof,
wherein proximal ends of the first and second barriers are respectively pivotally coupled within the first and second cavities about respective first and second pivot axes, and the first and second barriers move from the stored position to the extended position by respectively rotating about the first and second pivot axes,
wherein proximal ends of the first and second support members are respectively pivotally coupled to distal ends of the first and second barriers about respective third and fourth pivot axes,
wherein the first, second, third, and fourth pivot axes are oriented parallel to one another, and
wherein the first and second support members are moveable between a stored position in which the first and second support members respectively nest within first and second recesses respectively defined within the first and second barriers and a support position in which distal ends of the first and second support members extend away from their respective first and second barriers toward the first and second cavities defined in the mat body.

2. A vehicle floor mat as defined in claim 1, wherein, when the first and second barriers are in the stored position, inner surfaces of the first and second barriers face toward the mat body and opposite outer surfaces of the first and second barriers face away from the mat body, and wherein, when the first and second barriers are in the extended position, the outer surfaces of the first and second barriers are vertically oriented, with the outer surface of the first barrier facing toward the outer surface of the second barrier.

3. A vehicle floor mat as defined in claim 1, wherein, when the first and second barriers are in the stored position, the first and second support members are respectively contained within the first and second recesses in the first and second barriers and are located between the top and bottom surfaces of the mat body.

4. A vehicle floor mat as defined in claim 1, comprising first and second podiums respectively extending from the base walls of the first and second cavities toward a plane defined by the top surface of the mat body, and wherein, when the first and second support members are in the support position, distal ends of the first and second support members respectively rest against support surfaces defined by the first and second podiums.

5. A vehicle floor mat as defined in claim 4, wherein, when the first and second barriers are in the stored position, the first and second podiums respectively extend from the base walls of the first and second cavities, through the first and second support members, and at least partially through the first and second barriers.

6. A vehicle floor mat as defined in claim 1, wherein the first or second cavity includes a first coupling element integrally formed in one-piece with the base wall or the sidewall thereof and the corresponding first or second barrier includes a second coupling element integrally formed in one piece therewith and located at a proximal end thereof, and wherein, in assembly, the first and second coupling elements are snapped into engagement with each other to form a two-component pivot hinge.

7. A vehicle floor mat as defined in claim 1, wherein proximal ends of the first and second barriers include lateral projections integrally formed in one-piece therewith, and wherein, in assembly, the lateral projections of the first and second barriers respectively snap into slots formed in the sidewalls of the first and second cavities to respectively pivotally couple the proximal ends of the first and second barriers within the first and second cavities.

8. A vehicle floor mat as defined in claim 1, wherein, when the first and second barriers are in the stored position, inner surfaces of the first and second barriers respectively face toward the base walls of the first and second cavities defined in the mat body and outer surfaces of the first and second barriers face away from the mat body, and wherein, when the first and second barriers are in the extended position, the inner surfaces of the first and second barriers form an angle in the range of 60° to 120° with the top surface of the mat body.

9. A vehicle floor mat as defined in claim 1, wherein each of the first and second cavities includes a pocket formed in its peripheral sidewall that provides access to a distal end of the first or second barrier so that the first or second barrier can be manually moved from the stored position to the extended position.

10. A vehicle floor mat as defined in claim 1, wherein the top surface of the mat body includes a plurality of raised ribs separated by a plurality of channels.

11. A vehicle floor mat as defined in claim 1, wherein the mat body and the first and second barriers are formed via injection molding processes.

12. A vehicle floor mat as defined in claim 1, comprising:
third and fourth cavities formed in the mat body; and
third and fourth barriers respectively configured for receipt within the third and fourth cavities and moveable between a stored position wherein the third and fourth barriers are horizontally oriented and respectively contained within the third and fourth cavities and an extended position wherein the third and fourth barriers are vertically oriented and extend at least partially above the top surface of the mat body,
wherein, the first, second, third, and fourth cavities and their corresponding first, second, third, and fourth barriers are respectively located along first, second, third, and fourth sides of a package placement area on the vehicle floor mat, and
wherein the confined region is defined by the opposing surfaces of the first and second barriers and opposing surfaces of the third and fourth barriers.

13. A vehicle floor mat comprising:
a mat body including a top surface and an opposite bottom surface, the mat body being configured to conform to and overlie a surface defined by a passenger foot well or a cargo area of an automotive vehicle;
first and second cavities formed in the mat body, each of the first and second cavities defined by a base wall and a peripheral sidewall that extends from the top surface of the mat body to the base wall;
first and second barriers respectively configured for receipt within the first and second cavities and moveable between a stored position wherein the first and second barriers are horizontally oriented and respectively contained within the first and second cavities and an extended position wherein the first and second barriers are vertically oriented and extend at least partially above the top surface of the mat body;
first and second support members having proximal ends respectively pivotally coupled to the first and second barriers adjacent distal ends of the first and second barriers; and
first and second podiums respectively extending from the base walls of the first and second cavities toward a plane defined by the top surface of the mat body,
wherein, when both the first and second barriers are in the extended position, opposing surfaces of the first and second barriers together define a confined region therebetween in which a package can be contained during transportation thereof,
wherein, after the first and second barriers are moved to the extended position, the first and second support members are respectively configured to support and secure the first and second barriers in the extended position,
wherein the first and second support members are moveable between a stored position in which the first and second support members respectively nest within first and second recesses respectively defined within the first and second barriers and a support position in which distal ends of the first and second support members extend away from their respective first and second barriers toward the first and second cavities defined in the mat body, and
wherein, when the first and second support members are in the support position, distal ends of the first and second support members respectively rest against support surfaces defined by the first and second podiums.

14. A vehicle floor mat as defined in claim 13, wherein, when the first and second barriers are in the stored position, the first and second podiums respectively extend from the base walls of the first and second cavities, through the first and second support members, and at least partially through the first and second barriers.

15. A vehicle floor mat comprising:
a mat body including a top surface and an opposite bottom surface, the mat body being configured to conform to and overlie a surface defined by a passenger foot well or a cargo area of an automotive vehicle;
first and second cavities formed in the mat body, each of the first and second cavities defined by a base wall and a peripheral sidewall that extends from the top surface of the mat body to the base wall;
first and second barriers respectively configured for receipt within the first and second cavities and moveable between a stored position wherein the first and second barriers are horizontally oriented and respectively contained within the first and second cavities and an extended position wherein the first and second barriers are vertically oriented and extend at least partially above the top surface of the mat body;
first and second support members that, after the first and second barriers are moved to the extended position, are respectively configured to support and secure the first and second barriers in the extended position;
third and fourth cavities formed in the mat body; and
third and fourth barriers respectively configured for receipt within the third and fourth cavities and moveable between a stored position wherein the third and fourth barriers are horizontally oriented and respectively contained within the third and fourth cavities and an extended position wherein the third and fourth barriers are vertically oriented and extend at least partially above the top surface of the mat body,
wherein, when both the first and second barriers are in the extended position, opposing surfaces of the first and second barriers together define a confined region therebetween in which a package can be contained during transportation thereof,
wherein proximal ends of the first and second barriers are respectively pivotally coupled within the first and second cavities about respective first and second pivot axes, and the first and second barriers move from the stored position to the extended position by respectively rotating about the first and second pivot axes, wherein proximal ends of the first and second support members are respectively pivotally coupled to distal ends of the first and second barriers about respective third and fourth pivot axes, wherein the first, second, third, and fourth pivot axes are oriented parallel to one another, wherein, the first, second, third, and fourth cavities and their corresponding first, second, third, and fourth barriers are respectively located along first, second, third, and fourth sides of a package placement area on the vehicle floor mat, and wherein the confined region is defined by the opposing surfaces of the first and second barriers and opposing surfaces of the third and fourth barriers.

\* \* \* \* \*